Jan. 14, 1930.   F. KRUSE   1,743,858
SAUSAGE FORMING MACHINE
Filed July 18, 1924   3 Sheets-Sheet 2
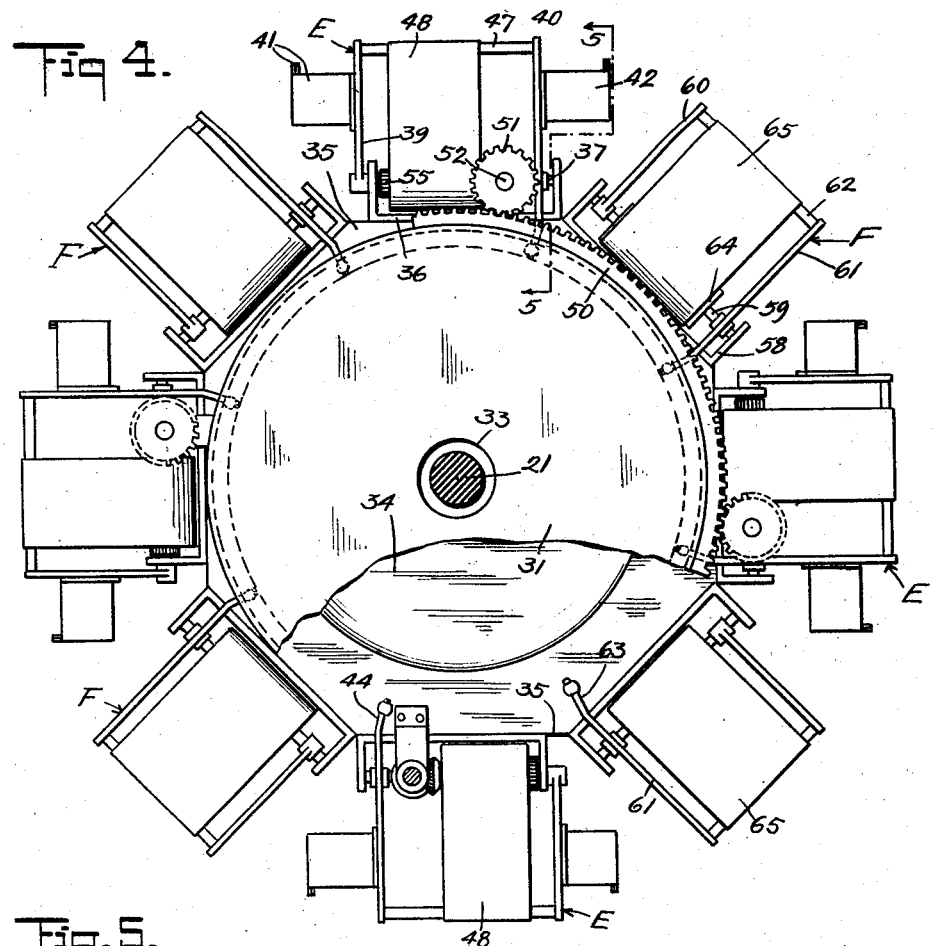
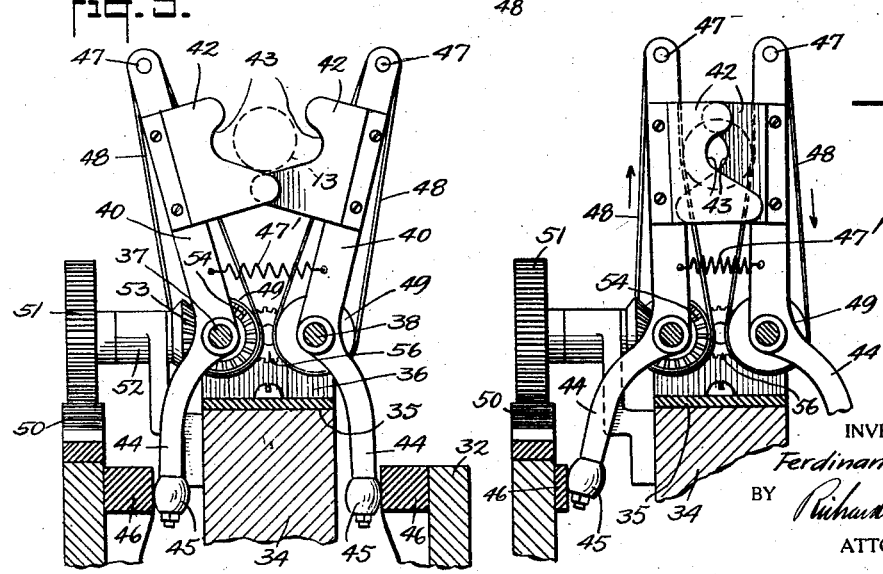
INVENTOR
Ferdinand Kruse
BY
ATTORNEYS Jan. 14, 1930. F. KRUSE 1,743,858
SAUSAGE FORMING MACHINE
Filed July 18, 1924 3 Sheets-Sheet 3
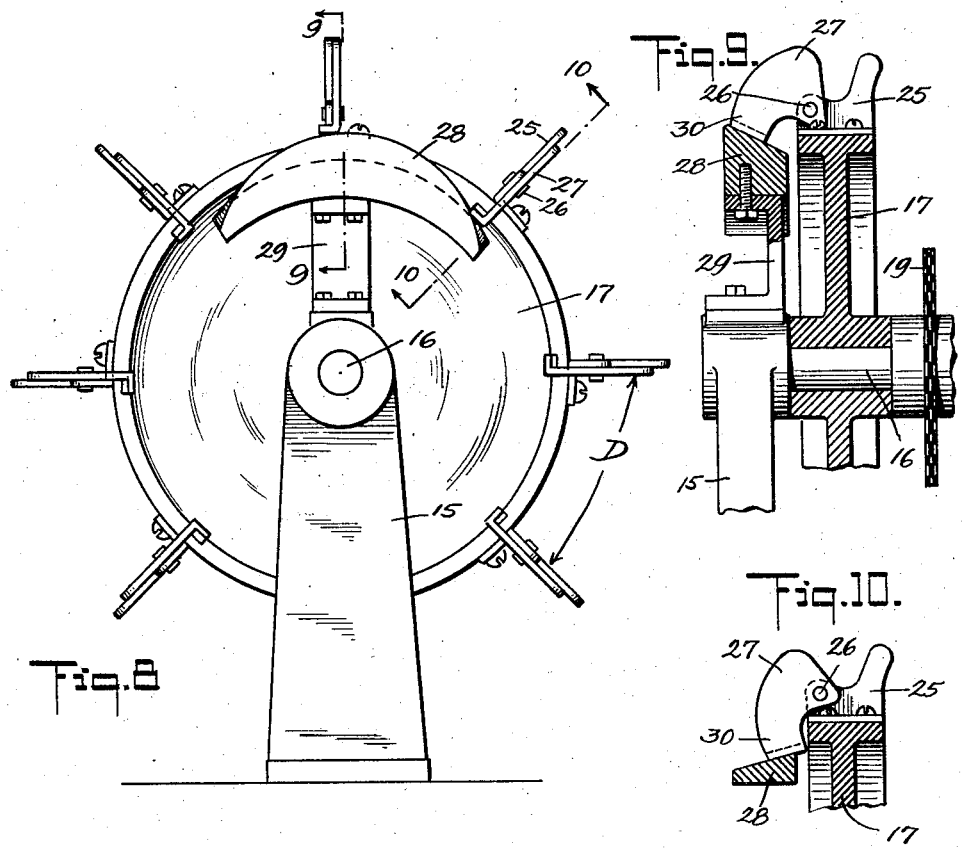
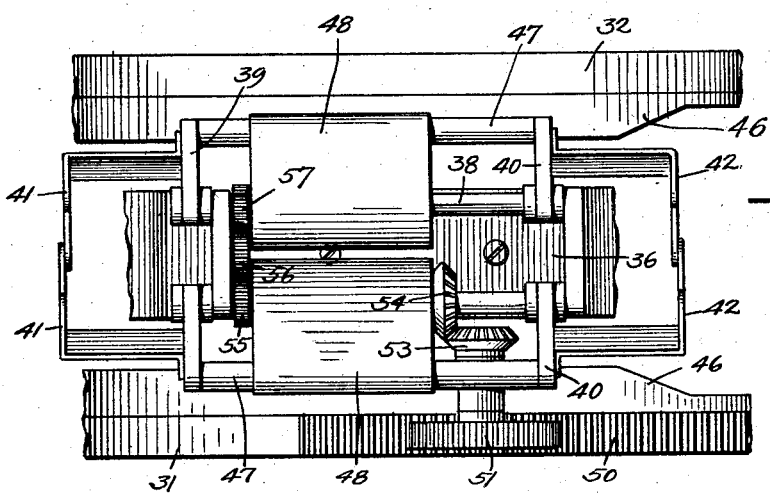
INVENTOR
Ferdinand Kruse
BY
ATTORNEYS.

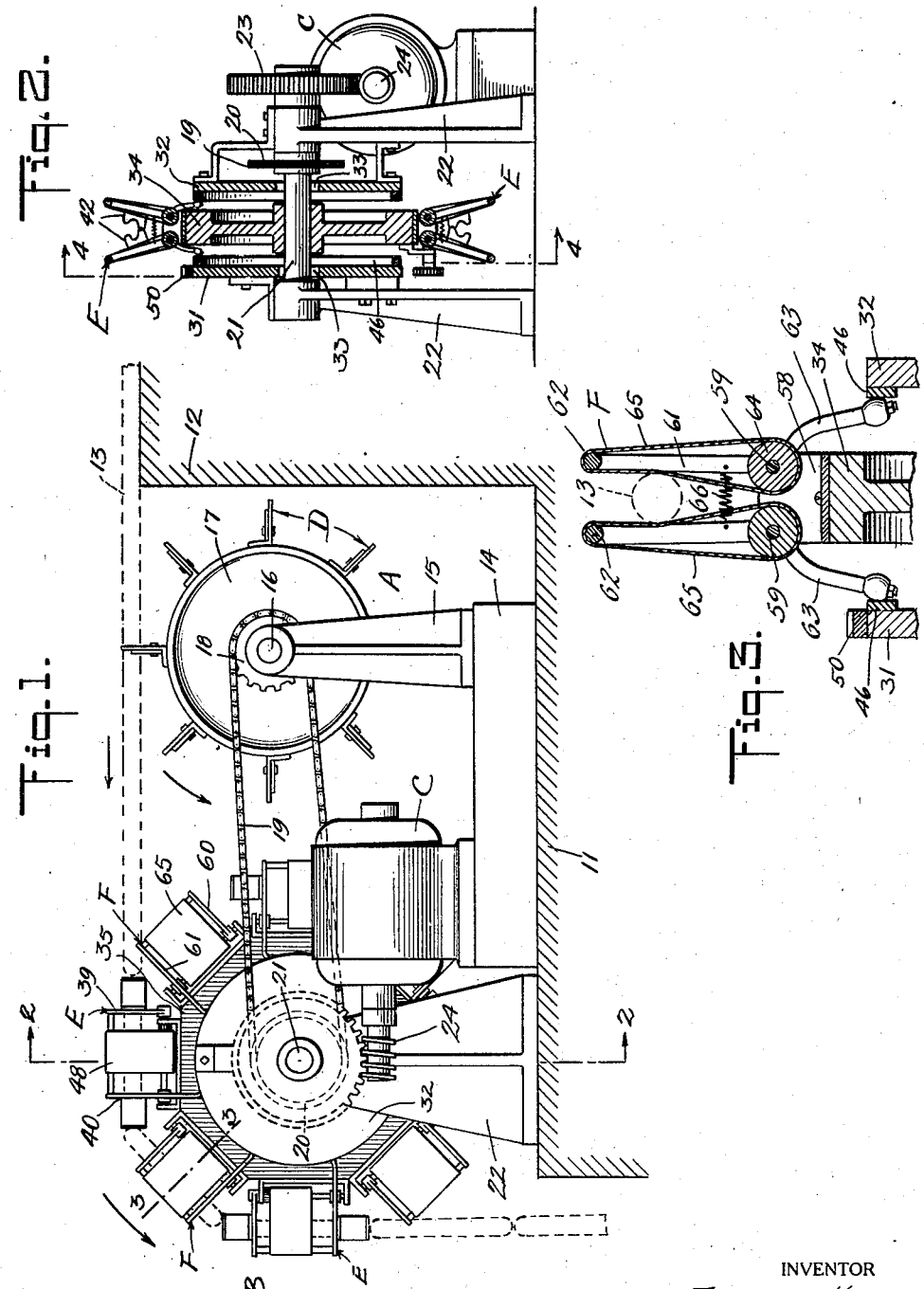

Patented Jan. 14, 1930

1,743,858

UNITED STATES PATENT OFFICE

FERDINAND KRUSE, OF NEW YORK, N. Y., ASSIGNOR OF ONE-HALF TO HENRY COHN, OF NEW YORK, N. Y.

SAUSAGE-FORMING MACHINE

Application filed July 18, 1924. Serial No. 726,652.

This invention relates to improvements in sausage forming machines and has particular reference to a machine in which a length of sausage together with its casing is subdivided into a plurality of links.

Heretofore, it has been customary to impart to the untwisted length of sausage, which will be hereinafter referred to as the casing for purposes of expediting the description, a linear and intermittent movement relative to the mechanism which twists and crimps or squeezes said casing and to utilize the time interval when the casing is stopped to effect the operation of said mechanism. It has also been proposed to provide a feeding mechanism for the casing wherein the latter is crimped preparatory to its being twisted and thereafter fed to a holding and twisting mechanism which is spaced from the feeding and crimping means. Such a construction has a decided disadvantage because of the fact that, due to the inherent nature of the sausage meat within the casing, the crimp formed at the feeding mechanism will be practically if not entirely obliterated by the time the portion of the casing crimped reaches the twisting mechanism.

An object of the present invention is to facilitate the production of linked sausage by continuously feeding the casing to a crimping and twisting mechanism the elements of which are operated at predetermined intervals to form the casing into a plurality of links.

Another object is to bodily move the crimping and twisting mechanism in the direction of the movement of the casing and during such movements actuate said mechanism to form the links.

A further object is to feed the casing to the continuously movable crimping and twisting mechanism in such manner that injury to the casing while being crimped and twisted will be avoided.

A still further object is the provision of a feeding mechanism by means of which the casing is positively fed to the crimping and twisting mechanism and securely held against displacement during the feeding operation.

A still further object is to provide a mechanism for feeding the casing in a slack condition to a crimping and twisting mechanism in which the operation of twisting the casing begins contemporaneously with the crimping operation.

The above and other objects will appear more clearly from the following detailed description when taken in connection with the accompanying drawings which illustrate a preferred embodiment of the inventive idea.

In the drawings:

Figure 1 is a side elevation of the machine constructed in accordance with the invention.

Figure 2 is a transverse section taken on the line 2—2 of Figure 1.

Figure 3 is a similar section taken on the line 3—3 of Figure 1.

Figure 4 is a section taken substantially on the line 4—4 of Figure 2 showing the crimping and twisting mechanism in side elevation and partially broken away.

Figure 5 is a section taken substantially on the line 5—5 of Figure 4 illustrating one of the crimping and twisting units in elevation and in its inoperative or normal position.

Figure 6 is a view similar to Figure 5 showing the unit in its operative position.

Figure 7 is a plan view of one of the crimping and twisting units together with a portion of the mechanism for operating the same.

Figure 8 is a side elevation of a feeding mechanism forming a part of the invention.

Figure 9 is a section on the line 9—9 of Figure 8; and

Figure 10 is a section on the line 10—10 of Figure 8.

In the form of the invention illustrated in the drawings, the machine is shown as comprising a feeding mechanism generally indicated by A and the crimping and twisting mechanism generally indicated by B, said mechanisms being driven from a common source of power such as an electric motor C. The machine as a whole is preferably mounted upon a suitable support 11 having an elevated portion 12 from which the casing 13 is passed to the feeding mechanism A.

This feeding mechanism A is preferably mounted upon a base 14 which also supports the motor C and includes a standard 15 in the upper end of which is journaled a shaft 16. Secured to the shaft 16 is a rotor 17 and this rotor is driven through the intermediary of a small gear 18 carried by the shaft 16 and engaged by an endless driving element such as a chain 19. This chain 19 also engages a gear 20, larger than the gear 18 which is carried by a rotatable shaft 21 journaled in the upper ends of the standards 22 mounted upon the support 11 and forming a part of the crimping and twisting mechanism B. The shaft 21 also carries a gear 23 driven from the worm 24 formed upon the shaft of the motor C. By making the gear 18 smaller than the gear 20 it will be apparent that the feeding mechanism A will be driven at a greater speed than that of the crimping and twisting mechanism B, the operation of which is controlled by the rotation of the shaft 21. This is done to avoid rupture or injury to the casing 13 as it is being fed from the mechanism A to the mechanism B. The latter mechanism as will be hereinafter described in detail, operates to crimp the casing 13 at predetermined intervals and in so doing has a tendency to stretch the casing which might otherwise injure the same if it were not for the fact that it is fed to the mechanism B at a greater speed than that of the rotation of the latter mechanism, thereby compensating for the possible injury to which the casing might otherwise be subjected.

The feeding mechanism further comprises a plurality of gripping units, each generally indicated by D, mounted at equidistances apart upon the periphery of the rotor 17. Each of the units D consists of a stationary gripping plate 25 secured in any preferred manner to the periphery of the rotor 17. Pivoted to the plate 25 at 26 is a movable gripping plate 27 which cooperates with the plate 25 to grip the casing 13 there-between sufficiently to pull the same from the elevated portion 12 of the support 11 and feed said casing toward the mechanism B as clearly indicated in Figure 1. The units D are each operated at a definite period during the movement of the rotor 17 and preferably during the passage of each unit through the highest point in the arc of its rotation. To accomplish this end, use is preferably made of a cam 28 carried by a bracket 29 mounted upon the upper end of the standard 15. The effective surface of the cam 28 is arranged in the path of movement of an extension 30 of each plate 27 so that as the rotor 17 is operated the extension 30 of the plate 27 of each unit will successively engage the cam 28 thereby causing the plate 27 to be moved about its pivot 26 toward the cooperating plate 25. This relative movement between the plates 25 and 27 is effected as the casing 13 passes therebetween and hence it will be apparent that said plates will co-act to grip the casing and thus carry it in the direction of the mechanism B.

The detail construction of the crimping and twisting mechanism B will now be described. This mechanism, in addition to the rotatable shaft 21 mounted in the standards 22, includes a pair of oppositely disposed stationary disks or plates 31 and 32 secured in any preferred manner to the standards 22 and having central openings 33 through which the shaft 21 extends. Disposed between the disks 31 and 32 is a rotor 34 secured to the shaft 21 so as to rotate therewith when said shaft is driven. The periphery of the rotor 34 is preferably provided with a plurality of flat surfaces 35 and to each of these flat surfaces there is secured either a crimping and twisting unit or a holding unit, said units being generally indicated by the characters E and F, respectively. The units E and F are alternately arranged on the rotor and respectively operate to crimp and twist and hold adjacent portions of the casing 13 as the latter is fed to said units so that as one portion of the casing is being held by a holding unit F the succeeding and adjacent portions of said casing are crimped and twisted relative to the first named portion thus forming connected links in the casing. This operation takes place during the continuous rotation of the rotor 34 as distinguished from known constructions wherein an intermittent operation of the crimping and twisting mechanism as a whole is effected.

Inasmuch as the units E are alike in construction it is believed that a detailed description of one of these units will suffice. Each unit E preferably comprises a frame or bracket 36 secured to one of the flat surfaces 35 of the rotor 34 and has journaled in its ends a pair of parallel shafts 37 and 38. At adjacent ends of the shafts 37 and 38 the same rockingly support relatively movable arms 39 (see Figs. 1 and 4) which normally diverge outwardly with respect to each other, as do the cooperating levers 40 which are also rockingly supported upon the opposite ends of the shafts 37 and 38. The arms 39 carry co-operating gripping plates 41 and likewise the levers 40 have secured thereto upon their upper portions the cooperating crimping plates 42. The crimping plates 41 and 42 are similar in construction, and as shown in Figures 5 and 6 said plates are provided with curved edges 43 which cooperate when the arms 39 are moved toward each other and the levers 40 similarly moved to crimp the casing 13 which passes between said plates. In order that the crimping plates 41 and 42 may be simultaneously made to cooperate by moving the plates of each set toward each other, the levers 40 are provided with extensions 44, the extremities of which have rollers 45 mounted thereon which engage with similar cams 46 carried by the inner surfaces of the disks 31 and 32. Thus as the rollers 45 engage the effective portions of the cams 46, the levers 40 and consequently the plates 42 are moved toward each other to the position shown in Figure 6 under the influence of a retractile spring 47' connecting said levers and when said rollers again engage the wide portions of the cams 46, as shown in Figure 5, said levers will be spread apart against the action of said spring. These movements of the levers 40 are transmitted to the arms 39 by reason of the fact that the upper ends of said arms and levers are connected by the rods 47 and thus it will be seen that by the cooperation of the crimping plates 41 and 42 the ends of a predetermined length of the casing 13 will be crimped between said plates. Now, in order that said length of casing may be twisted about a longitudinal axis and relative to a next adjacent portion of the casing which is being held by one of the units F, the unit E further comprises a pair of oppositely disposed and endless twisting belts 48 which extend about the rods 47 and larger rods 49 secured to the rotatable shafts 37 and 38. These belts are designed to receive the casing 13 therebetween intermediate the points of suspension thereof so that the full effect of the movement of said belts will be transmitted to the casing when the latter is engaged thereby.

It is proposed to drive these belts 48 in the same direction during the time that the crimping plates 41 and 42 are in operated positions, as shown in Figure 6, and, to this end use is preferably made of a segmental rack 50 secured to the periphery of the stationary disk 31 and extending a distance about said periphery sufficient to permit of the simultaneous operation, during one stage of the rotation of the rotor 34, of two of the units E and the interposed unit F, as clearly shown in Figure 4.

Meshing with the rack 50 is a gear 51 carried by one end of the shaft 52, the other end of said shaft supporting a bevel gear 53 which meshes with a similar gear 54 secured to shaft 37. This shaft 37 also carries a gear 55 meshing with an idler gear 56 which in turn drives another gear 57 carried by the shaft 38 so that the latter shaft will be rotated in the same direction as the shaft 37. Thus, as shown in Figure 6, belts 48 will be driven in the same direction about the rollers 47 and 49 and the opposed inner portions of said belts will engage the casing 13 and twist the same while the gear 51 is engaged with the rack 50.

Each holding unit F, which is interposed between two adjacent units E consists of a frame or bracket 58 similar to the frame 36 and having mounted therein two parallel rods 59. These rods support the cooperating arms 60 and levers 61 similar in construction to the arms 39 and levers 40, respectively, and each arm 60 is joined to one of the levers 61 at the upper ends thereof by a rod or roller 62. The levers 61 are formed with extensions 63, like the extensions 44, and these extensions are engageable with the cams 46 so as to cause the arms 60 and likewise the levers 61 to be moved toward each other. The rods or rollers 62 and similar members 64 secured to the rods 59 support the stationary holding belts or other similar elements 65. The unit F is shown in its operative position in Figure 3 in which position the extensions 63 have engaged the narrow portion of the cams 46 and the retractile spring 66 has acted to draw the holding belts 65 toward each other to engage the casing 13 and thus hold that portion of the casing engaged by said belts stationary relative to the preceding and succeeding portions of the casing which are being twisted.

Referring to Figure 4, the general operation of the crimping and twisting mechanism will now be described. As the gear 51 of the unit E shown on the top of said figure engages with the rack 50 the rotation of the shafts 37 and 38 and consequently of the belts 48 begins. At the same time the rollers 45 of the extensions 44 will engage the inclined surfaces of the cams 46 and the sets of crimping plates will then begin to move toward each other to crimp a predetermined length of the casing 13. As soon as the belts 48 engage with the casing the twisting operation starts and this operation continues upon said predetermined length of the casing until the gear 51 of the unit E disengages from the rack 50. The unit E will then be in the position of the unit shown at the right of Figure 4. The unit succeeding the unit E, the operation of which has just been described, is one of the holding units and when this latter unit reaches the position of said unit E, as shown in the drawing, the extensions 63 of the levers 61 of said unit F will engage with the inclined surfaces of the cams 46 and the belts 65 of said unit will then be moved toward each other to engage the portion of the casing 13 next succeeding that portion which is being twisted by the unit E. From an inspection of Figure 4 it will thus be seen that during rotation of the crimping and twisting mechanism three of the units E and F will at all times be in engagement with and operating upon the casing 13 so that after said casing has passed from the control of said units the same will be twisted into a plurality of links. As shown in Figure 4, two of the units E and the single interposed holding unit F are in operation. However, as the rotation continues and the unit E shown on the right of said Figure passes on beyond the control of the rack 50 the holding unit F succeeding the unit E at the top of said figure will have then come into operation so that at this stage two of the holding units and only one of the units E will be effective.

What is claimed is:

1. In a sausage forming machine, a casing feeding mechanism, a movable mechanism to which the casing is fed, said mechanism including crimping and twisting elements operable to crimp and twist said casing subsequent to the operation of said feeding mechanism and said twisting elements consisting of opposed and continuously driven flexible elements, and means for operating said crimping and twisting elements during the movement of said crimping and twisting mechanism.

2. In a sausage forming machine, a casing feeding mechanism, a rotatable mechanism to which the casing is fed, said mechanism including crimping and twisting elements operable to crimp and twist said casing subsequent to the operation of said feeding mechanism and said twisting elements consisting of opposed flexible members, and means for operating said crimping and twisting elements during the rotation of said crimping and twisting mechanism.

3. In a sausage forming machine, a rotor, a crimping and twisting mechanism carried by said rotor, and including opposed rockingly supported members movable toward and away from each other, endless movable twisting belts carried by said members and cooperating with each other to receive and engage a casing between the same intermediate the points of suspension of said belts, and crimping elements also carried by said opposed members and coacting to crimp said casing therebetween when said members are moved toward each other.

4. In a sausage forming machine, a rotor, a crimping and twisting mechanism carried by said rotor and including opposed rockingly supported members movable toward and away from each other, endless movable twisting belts carried by said members and cooperating with each other to receive and engage a casing between the same intermediate the points of suspension of said belts, crimping elements also carried by said opposed members and coacting to crimp said casing therebetween when said members are moved toward each other, and means operable at predetermined intervals to move said opposed members toward each other to cause said belts to engage said casing and twist the same.

5. In a sausage forming machine, a rotor, a crimping and twisting mechanism carried by said rotor, and including opposed rockingly supported members movable toward and away from each other, endless movable twisting belts carried by said members and cooperating with each other to receive and engage a casing between the same intermediate the points of suspension of said belts, crimping elements also carried by said opposed members and coacting to crimp said casing therebetween when said members are moved toward each other, and means controlling the movement of said opposed members to cause said crimping elements to crimp and engage said casing at the time said belts initially engage the casing.

In testimony whereof I have affixed my signature.

FERDINAND KRUSE.